United States Patent [19]

Takada

[11] 4,208,770

[45] Jun. 24, 1980

[54] BELT CLAMP FOR A VEHICLE PASSENGER RESTRAINT BELT SYSTEM

[76] Inventor: Juiiro Takada, 3-12-1, Shinmachi Setagayaku, Tokyo, Japan

[21] Appl. No.: 28,906

[22] Filed: Apr. 10, 1979

[30] Foreign Application Priority Data

May 22, 1978 [JP] Japan .................................. 53-67808

[51] Int. Cl.² ...................... A62B 35/00; B60R 21/10; F16B 2/14; F16B 2/16
[52] U.S. Cl. ................................... 24/136 K; 24/194; 280/806; 297/476
[58] Field of Search ............. 24/136 K, 136 R, 136 L, 24/136 A, 171, 194, 195, 196; 297/476, 478, 479; 280/806, 807

[56] References Cited

U.S. PATENT DOCUMENTS

| 3,442,529 | 5/1969 | Lewis et al. | 247/479 |
| 3,695,697 | 10/1972 | Stoffel | 297/479 |
| 3,847,434 | 11/1974 | Weman | 297/478 |

Primary Examiner—Alexander Grosz
Attorney, Agent, or Firm—Brumbaugh, Graves, Donohue & Raymond

[57] ABSTRACT

A seat belt clamp comprises a clamp member which clamps the belt against a frame base when an abnormally high pull-out force is exerted on the belt. The clamp member is forced toward the belt by the combined effects of the wedging action of a roll around which the belt turns against a wedging surface of the clamp member and oblique guides on the frame which cam the clamp member toward the base and away from the roller. Springs urge both the roller and the clamp member toward released positions for easy, smooth release of the belt when the high pull-out force ceases.

3 Claims, 5 Drawing Figures

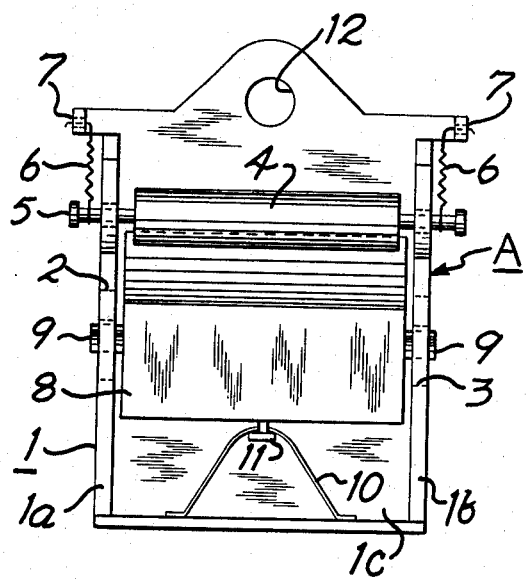
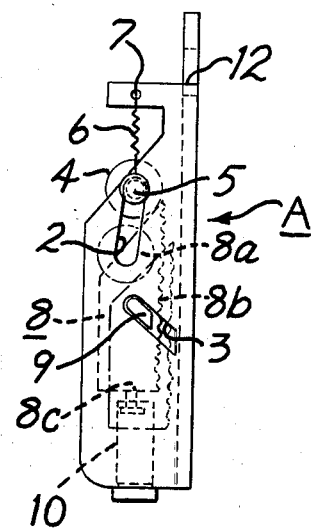
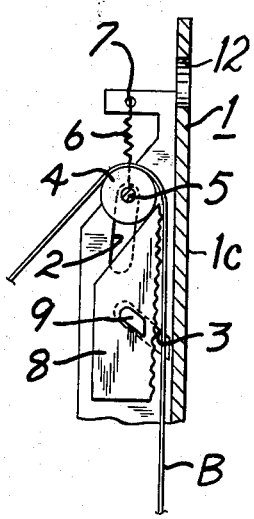
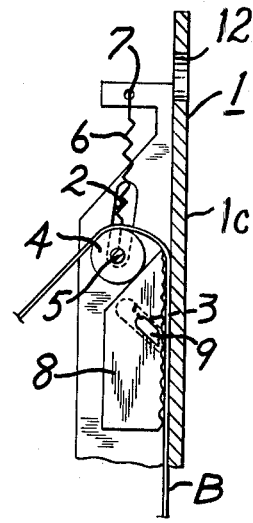

BELT CLAMP FOR A VEHICLE PASSENGER RESTRAINT BELT SYSTEM

FIELD OF THE INVENTION

This invention relates to a belt clamp for use in a vehicle passenger restraint belt system and, in particular, to a belt clamp which locks the belt in response to an abnormally high pull-out force and readily releases the belt when the high force ceases.

BACKGROUND OF THE INVENTION

Most passenger restraint belt systems use retractors of the emergency locking type in which the reel locks in response to a relatively high, abnormal acceleration or deceleration of the vehicle. It has been recognized that emergency locking retractors allow a rather considerable elongation of the belt, even though the reel is locked, because the several turns of the belt normally on the reel are initially loose and are pulled tight when the passenger is thrown forward and because the belt itself elongates.

It is, of course, desirable and sometimes necessary, especially in small automobiles, to limit belt elongation, and various ways of doing so have been proposed. Most of the proposals have been unsatisfactory either because they allow the belt to slip or present a risk of belt failure by cutting or digging into it. In many of the few devices which seem to lock the belt reasonably well, the lock is so effective that it is very difficult to release the belt, thus causing great inconvenience and sometimes real difficulty for a passenger who finds himself or herself strapped in the vehicle after a crash. If the belt does not release readily, there may, in fact, be great danger to the occupant in case of a fire or some other reason for rapid escape.

SUMMARY OF THE INVENTION

There is provided, in accordance with the present invention, an improved belt clamp which clamps the belt effectively up to its minimum tensile strength in response to an abnormally high pull-out force on the belt and reliably and readily releases the belt when the high force ceases. The belt clamp comprises a frame having a pair of spaced apart sides and a base. A roller is slidably received in a pair of slots in the frame sides for movement between a releasing position and a clamping position. A clamp member is mounted between the frame sides adjacent the roller and has a wedge surface which is engaged by the roller and by which a wedge action exerted on the clamp member by shifting of the roller toward the clamp position forces the clamp member toward the frame base. The clamp member is mounted on the frame by guides which constrain the clamp member to shift obliquely toward the base and away from the releasing position of the roller. Springs urge both the roller and clamp member toward the releasing positions.

The belt is trained through the space between the clamp member and frame base (the frame base being, functionally, the second part of a pair of clamping members), passes around the roller and leads away from the roller in a direction such that a pull-out force on it tends to move the roller from the releasing to the clamping position. In other words, the belt turns around the roller through an angle of somewhat more than 90°. In this respect, the belt clamp functions as a turning roll for the belt.

A normal pull-out force on the belt, such as the force exerted when the belt is pulled out in the course of putting it on or removing it from the passenger or upon normal movements of the passenger, is insufficient to overcome the spring force on the roller. Meanwhile, the clamping member spring holds the clamping member away from the belt in the releasing position. Accordingly, the belt clamp allows the belt to be freely wound and unwound from the retractor in normal circumstances.

In the event of a crash or other emergency, the reel of the emergency locking retractor locks. Should the passenger be thrown forward and exert an abnormally high pull-out force on the belt, that force acts on the roller and pulls it toward the clamping position. The roller engages the wedge surface and wedges the clamp member into firm engagement with the belt by pushing the clamping member obliquely in the guide slots, which involves both a wedging action of the roller on the clamping member and a camming action of the guide slots on the clamping member. The belt is thereby tightly clamped between the clamping member and the frame base.

When the high belt pull-out force ceases and the belt force is somewhat less than the spring force, the springs move the roller and clamping member back to the releasing positions. Normal function is restored to the belt system, and the passenger is thus able to release the belt with ease or to move about normally.

For a better understanding of the invention, reference may be made to the following description of an exemplary embodiment taken in conjunction with the figures of the accompanying drawings.

DESCRIPTION OF THE DRAWINGS

FIG. 1 is a front view of the embodiment;
FIG. 2 is a side view of the embodiment;
FIGS. 3 and 4 are side cross-sectional views in generally schematic form depicting the operation of the embodiment.

DESCRIPTION OF AN EMBODIMENT

Figure 5:
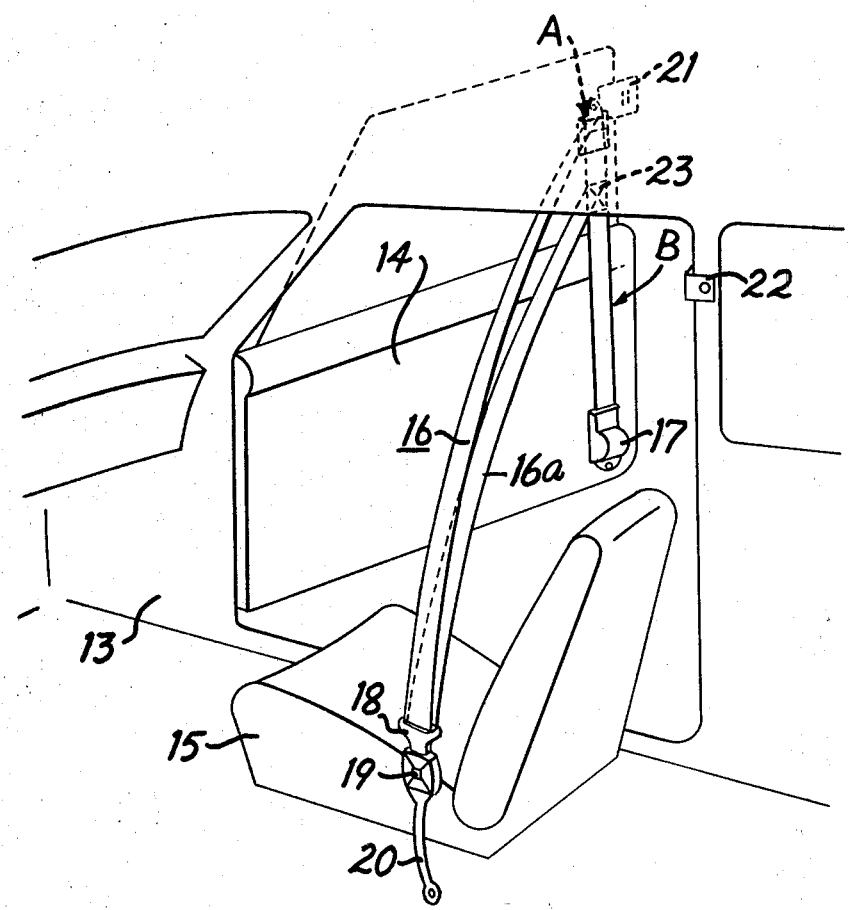
FIG. 5 is a pictorial view in generally shematic form of a passive vehicle passenger restraint belt system which includes a belt clamp.

The belt clamp A shown in FIGS. 1 to 4 comprises a generally U-shaped frame 1 consisting of side flanges 1a and 1b and a base 1c. A pair of elongated slots 2 lying generally parallel to the plane of the base 1c slidably receive a shaft 5 which carries a roller 4. A pair of tension springs 6, one end of each of which is joined to an end of the shaft 5 and the other to lugs 7 on the frame, urges the roller 4 to a releasing position (FIGS. 2 and 3) in which the shaft 5 resides in the upper end of the slots 2.

Each flange 1a and 1b of the frame has a second slot 3 oriented obliquely to the plane of the base 1c. A clamp member 8 received between the flanges is guided by means of lugs 9 received in the slots 3 to move downwardly and toward the base 1c to clamp a belt B against the base 1c but is normally urged to a retracted, releasing position by a spring 10 attached by a pin 11 to the lower face 8c of the clamp member.

In a typical installation of the belt clamp of FIGS. 1 to 4, as shown in FIG. 5, the belt clamp A is affixed to the upper rear corner of the door 14 of a vehicle body 13, a hole 12 being provieded in the frame 1 for that purpose. One end of the belt B leads up from a retractor 17 affixed to the lower rear corner of the door, passes between the clamp member 8 and the base 1c (see FIGS. 3 and 4) and turns around the roller 4. A section 16 of the belt leads across the vehicle seat 15 and passes freely through a slot in a buckle tongue 18 which is normally affixed to a buckel 19 mounted on a support 20 affixed to the vehicle at the inboard side and generally to the rear of the seat. A second portion 16a of the belt leads back across the seat and is sewn to the portion of the belt leading from the retractor, as indicated by the reference numeral 23. The attachment of the belt clamp A to the vehicle body 13 when the door is closed is strengthened by a bracket 21 on the door which is bolted to the belt clamp A and mates with a reinforcing plate 22 secured to the frame pillar behind the door. When the door is opened, as shown in FIG. 5, a length of belt is pulled from the retractor to accommodate the increased distance between the inboard attachment point at the buckle 19 and the rearward portion of the door. When the door is closed, that length of belt is drawn back into the retractor, thereby pulling the outboard end of the belt section 16a into a position in which the juncture 23 is located near the retractor. Accordingly, the belt section leading from the belt clamp to the buckle becomes a shoulder belt, while the belt section 16a between the juncture 23 and the buckle becomes a lap belt.

Referring again to FIGS. 1 to 4, movement of the belt B through the belt clamp A during opening and closing movements of the door and, depending upon the type of retractor used in the system, movements of the vehicle occupant, are insufficient to produce a pulling force on the belt section 16 to overcome the forces of the springs 6 and 10 of the belt clamp. Accordingly, the clamp member 8 and the roller 4 normally reside in the releasing positions shown in FIG. 3. When an abnormally high pull-out force is exerted on the belt, the forces in the springs 6 and 10 are overcome and the roller 4 is pulled downwardly, thereby forcing the clamp member 8 downwardly and toward the base 1c of the frame 1. The roller 4 works against a wedge surface 8a at the upper end of the clamp member, and the slots 3 guide the clamp member 8 into the clamping position (FIG. 4) in which a corrugated gripping surface 8b on the clamp member grips the belt and prevents it from being pulled through the clamp. The passenger is thus held firmly and prevented from being thrown forward. The clamp prevents the relatively loose turns of the belt on the retractor reel from being pulled from the retractor through tightening under the high pull-out forces.

When the high forces on the belt cease, the clamp smoothly and readily releases the belt; the springs 6 pull the roller upwardly from the clamping position (FIG. 4) to the releasing position (FIG. 3), and the spring 10 pushes the clamp member 8 upwardly and outwardly to the releasing position. Among the advantages of the invention are the fact that the belt runs freely between the base 1c and the clamp member without engaging them and is thus not subject to wear in normal operation. The roller 4 serves as a turning roll for the belt. The clamping action is extremely effective and enhances the safety of the vehicle occupant, and the clamp readily releases from the clamping position.

The belt system shown in FIG. 5 is merely exemplary of various uses of the clamp in various types of restraint belt arrangments. The belt clamp is of simple and durable construction and can be made in a relatively small size, thus permitting it to be installed in locations where there is insufficient space for larger devices.

The above described embodiment of the belt clamp is also merely exemplary, and numerous variations and modifications will be apparent to those skilled in the art without departing from the spirit and scope of the invention. All such variations and modifications are intended to be included within the scope of the invention as defined in the appended claims.

I claim:

1. A belt clamp for a vehicle passenger restraint belt system comprising a frame having a pair of spaced-apart sides and a base; a roller slidably received in a pair of slots in the frame sides for movement between a releasing position and a clamping position; a clamp member mounted between the frame sides adjacent the roller and having a wedge surface engaged by the roller and coacting therewith such that the clamp member is wedged toward the frame base by the roller upon movement of the roller toward the clamping position; cooperating guide means on the clamp member and the frame for guiding the clamp member toward and away from the base in a direction oblique to the base, the clamp member moving in a direction toward the release position of the roller at the same time that it moves away from the base; a spring urging the roller toward the release position; and a spring urging the clamp member in a direction toward the roller, whereby both the clamp and roller are normally urged toward releasing positions such that a belt led between the base and the clamp member and thence around the roller and away from the roller in a direction exerting a force on the roller in a direction toward the clamping position is free to move through the belt clamp and whereby an abnormally high pull-out force on the belt shifts the roller toward the clamping position and clamps the belt between the clamping member and the frame base by a combination of the wedging action of the roller on the wedge surface of the clamp member and the guiding action of the guide means.

2. A belt clamp according to claim 1 wherein the clamping member has a corrugated belt gripping surface facing the frame base.

3. A belt clamp according to claim 1 wherein the guide means includes a pair of slots in the frame side members oriented obliquely to the frame base and corresponding lugs on the clamping member received in the respective slots.

* * * * *